(12) United States Patent  
Lee et al.

(10) Patent No.: US 9,189,370 B2  
(45) Date of Patent: Nov. 17, 2015

(54) SMART TERMINAL FUZZING APPARATUS AND METHOD USING MULTI-NODE STRUCTURE

(71) Applicant: ELECTRONICS AND TELECOMMUNICATIONS RESEARCH INSTITUTE, Daejeon (KR)

(72) Inventors: Jaehun Lee, Daejeon (KR); Yosik Kim, Daejeon (KR); Eunyoung Kim, Daejeon (KR); Jinmo Park, Daejeon (KR); Youngtae Yun, Daejeon (KR); Kiwook Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 112 days.

(21) Appl. No.: 14/087,925

(22) Filed: Nov. 22, 2013

(65) Prior Publication Data

US 2014/0351643 A1    Nov. 27, 2014

(30) Foreign Application Priority Data

May 23, 2013   (KR) .................. 10-2013-0058256

(51) Int. Cl.
```
G06F 11/00      (2006.01)
G06F 11/36      (2006.01)
G06F 21/57      (2013.01)
```
(52) U.S. Cl.
CPC ........ *G06F 11/3668* (2013.01); *G06F 11/3676* (2013.01); *G06F 11/3688* (2013.01); *G06F 21/577* (2013.01)

(58) Field of Classification Search
None
See application file for complete search history.

(56) References Cited

U.S. PATENT DOCUMENTS

| 5,642,504 A | 6/1997 | Shiga | |
| 7,454,659 B1* | 11/2008 | Gaudette et al. | 714/33 |
| 7,743,281 B2 | 6/2010 | Conger et al. | |
| 2006/0277606 A1* | 12/2006 | Yunus et al. | 726/25 |

(Continued)

FOREIGN PATENT DOCUMENTS

| JP | 06-187275 A | 7/1994 |
| JP | 2007-115071 A | 5/2007 |

(Continued)

OTHER PUBLICATIONS

"Fuzzing," Journal of Latest news understanding by keyword Network • Keyword 2008, 2008.

*Primary Examiner* — Gabriel Chu  
(74) *Attorney, Agent, or Firm* — LRK Patent Law Firm

(57) ABSTRACT

The present invention relates to a smart terminal fuzzing apparatus and method using a multi-node structure. The smart terminal fuzzing apparatus includes a fuzzing command management unit for managing fuzzing instructions corresponding to performance of fuzzing. An algorithm management unit creates fuzzing commands based on the fuzzing instructions, and distributes the fuzzing commands to a plurality of fuzzing nodes connected to a fuzzing client depending on a distribution algorithm. A fuzzing client management unit performs control such that fuzzing is performed by the plurality of fuzzing nodes in compliance with the fuzzing commands through the fuzzing client. A log management unit receives results of performance of fuzzing from the plurality of fuzzing nodes and manages the fuzzing results.

6 Claims, 4 Drawing Sheets

(56) References Cited

U.S. PATENT DOCUMENTS

| | | |
|---|---|---|
| 2007/0203973 A1* | 8/2007 | Landauer et al. ............ 709/203 |
| 2008/0256340 A1* | 10/2008 | Conger et al. ............... 712/217 |
| 2008/0301647 A1* | 12/2008 | Neystadt et al. ............. 717/127 |
| 2009/0119647 A1 | 5/2009 | Kim et al. |
| 2009/0164975 A1* | 6/2009 | Natanov et al. .............. 717/127 |
| 2010/0287412 A1 | 11/2010 | Cha et al. |
| 2012/0137369 A1 | 5/2012 | Shin et al. |

FOREIGN PATENT DOCUMENTS

| | | |
|---|---|---|
| JP | 2011-018173 A | 1/2011 |
| JP | 2011-188113 A | 9/2011 |
| JP | 2013-012038 A | 1/2013 |
| KR | 10-2001-0076709 A | 8/2001 |
| KR | 10-2009-0044656 A | 5/2009 |
| KR | 10-2010-0121225 A | 11/2010 |
| KR | 10-2012-0057870 A | 6/2012 |

* cited by examiner

SMART TERMINAL FUZZING APPARATUS AND METHOD USING MULTI-NODE STRUCTURE

CROSS REFERENCE TO RELATED APPLICATION

This application claims the benefit of Korean Patent Application No. 10-2013-0058256 filed on May 23, 2013, which is hereby incorporated by reference in its entirety into this application.

BACKGROUND OF THE INVENTION

1. Technical Field

The present invention relates generally to a smart terminal fuzzing apparatus and method using a multi-node structure and, more particularly, to a smart terminal fuzzing apparatus and method, which can detect the vulnerable points of software at high speed by performing fuzzing using a plurality of smart terminals.

2. Description of the Related Art

Fuzzing is one method for a black box test and is mainly used as a method of detecting errors or vulnerable points when the internal structure of software is not known. Fuzzing enables vulnerable points to be checked using errors occurring during a process for inputting and processing an arbitrarily manipulated file. Actual fuzzing is performed by generating an arbitrarily manipulated file and inputting a manipulated sample file. When fuzzing is performed by a single device, a considerably long time is required, and thus an efficient and fast fuzzing technique is required.

For example, U.S. Pat. No. 7,743,281 relates to a method of fuzzing a file using a computer device, but has limitations in connecting smart terminals and performing fuzzing operations.

In this way, such a fuzzing technique for manipulating and analyzing the input of software is performed by a computer device, wherein a method of manipulating a file on an actual computer device or transmitting a manipulated packet via a network is used. In a normal computer device, a method of processing fuzzing operations in parallel by constructing a virtual environment is present.

However, technology is not yet developed in which fuzzing areas are distributed to a plurality of fuzzing samples to be executed depending on a scheduling algorithm with respect to the software of smart terminals, and in which distributed fuzzing execution commands and data to be fuzzed are automatically distributed to smart terminals and then fuzzing is performed.

SUMMARY OF THE INVENTION

Accordingly, the present invention has been made keeping in mind the above problems occurring in the prior art, and an object of the present invention is to provide a smart terminal fuzzing apparatus and method, which can detect the vulnerable points of software at high speed by performing fuzzing using a plurality of smart terminals.

In accordance with an aspect of the present invention to accomplish the above object, there is provided a smart terminal fuzzing method using a multi-node structure, including generating, by a smart terminal fuzzing apparatus, a plurality of fuzzing nodes that are to perform fuzzing on a plurality of smart terminals, respectively; making a connection to a fuzzing client corresponding to the plurality of fuzzing nodes; creating fuzzing commands to be transmitted to the plurality of smart terminals; distributing the fuzzing commands to the plurality of fuzzing nodes connected to the fuzzing client depending on a distribution algorithm; and performing control such that fuzzing is performed by the plurality of fuzzing nodes in compliance with the fuzzing commands through the fuzzing client.

Preferably, creating the fuzzing commands may be configured to create the fuzzing commands based on fuzzing instructions to be transmitted to the plurality of smart terminals.

Preferably, the fuzzing instructions may include a target file which is to be fuzzed, a method of modulating the target file, a method of executing a modulated target file, and a path for storing the results of execution.

Preferably, distributing the fuzzing commands to the fuzzing nodes may be configured to check a number of the fuzzing nodes connected to the fuzzing client and distribute the fuzzing commands to the fuzzing nodes depending on the distribution algorithm.

Preferably, the distribution algorithm may be an algorithm for distributing fuzzing areas depending on the fuzzing client, and may be configured to set a sequence of distributed fuzzing areas and distribute the fuzzing areas to the fuzzing nodes according to the set sequence.

In accordance with another aspect of the present invention to accomplish the above object, there is provided a smart terminal fuzzing apparatus using a multi-node structure, including a fuzzing command management unit for managing fuzzing instructions corresponding to performance of fuzzing; an algorithm management unit for creating fuzzing commands based on the fuzzing instructions, and distributing the fuzzing commands to a plurality of fuzzing nodes connected to a fuzzing client depending on a distribution algorithm; a fuzzing client management unit for performing control such that fuzzing is performed by the plurality of fuzzing nodes in compliance with the fuzzing commands through the fuzzing client; and a log management unit for receiving results of performance of fuzzing from the plurality of fuzzing nodes and managing the fuzzing results.

Preferably, the fuzzing instructions may include a target file which is to be fuzzed, a method of modulating the target file, a method of executing a modulated target file, and a path for storing the results of execution.

Preferably, the algorithm management unit may check a number of the fuzzing nodes connected to the fuzzing client and distribute the frizzing commands to the fuzzing nodes depending on the distribution algorithm.

Preferably, the distribution algorithm may be an algorithm for distributing fuzzing areas depending on the fuzzing client and may be configured to set a sequence of distributed fuzzing areas and distribute the fuzzing areas to the fuzzing nodes according to the set sequence.

Preferably, the log management unit may connect the fuzzing commands to results of performance of fuzzing by the plurality of fuzzing nodes in compliance with the fuzzing commands and manages connected results as log.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
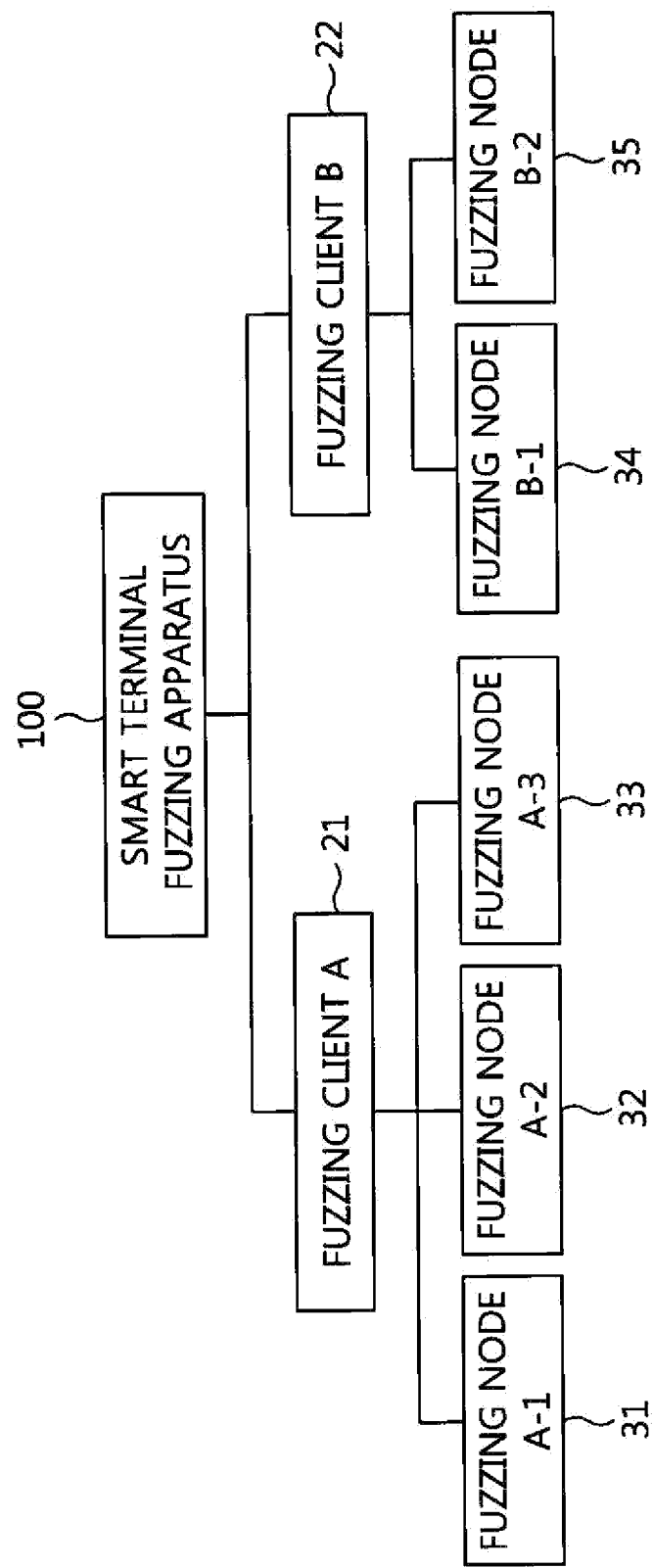
FIG. 1 is a diagram schematically showing the configuration of an environment to which a smart terminal fuzzing apparatus using a multi-node structure is applied according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, a smart terminal fuzzing apparatus and method using a multi-node structure according to preferred embodiments of the present invention will be described in detail with reference to the attached drawings.

FIG. 1 is a configuration diagram schematically showing an environment to which a smart terminal fuzzing apparatus using a multi-node structure according to an embodiment of the present invention is applied.

First, the present invention relates to fuzzing performed using a smart terminal on which an Android Operating System (OS) or Apple's iOS is installed, and is configured to perform black box fuzzing on the smart terminal so as to detect the errors or vulnerable points of software in the smart terminal.

Here, fuzzing is a method that discovers a problem by modulating the entire or partial area of a target file, inputting a modulated file, and causing errors or vulnerable points in the software.

Referring to FIG. 1, an environment to which a smart terminal fuzzing apparatus 100 using a multi-node structure according to an embodiment of the present invention is applied includes a plurality of fuzzing clients and a plurality of fuzzing nodes.

The smart terminal fuzzing apparatus 100 performs communication with N fuzzing clients, for example, a fuzzing client A 21 and a fuzzing client B 22, through a communication network. In this case, the smart terminal fuzzing apparatus 100 functions as a server, and the fuzzing clients function as clients.

Each of the plurality of fuzzing clients performs communication with fuzzing nodes through a communication network or using Universal Serial Bus (USB) communication.

For example, the fuzzing client A 21 performs communication with a fuzzing node A-1 31, a fuzzing node A-2 32, and a fuzzing node A-3 33, and the fuzzing client B 22 performs communication with a fuzzing node B-1 34 and a fuzzing node B-2 35. In this case, the fuzzing client A 21 and the fuzzing client B 22 function as servers and corresponding fuzzing nodes function as clients, respectively.

Each server described above generally corresponds to an information provision computer for providing a service, and each client generally corresponds to a computer that uses the service provided by the server.

Each of the fuzzing clients individually receives fuzzing commands and data from the smart terminal fuzzing apparatus 100, and transmits the fuzzing commands and the data to the fuzzing nodes connected thereto.

Each of the fuzzing nodes corresponds to the fuzzing node of a smart terminal, performs fuzzing in compliance with the corresponding fuzzing command and data received from the corresponding fuzzing client, and transfers the results of the performance to the smart terminal fuzzing apparatus 100.

For example, each of the fuzzing node A-1 31, the fuzzing node A-2 32, and the fuzzing node A-3 33 performs fuzzing, transfers the results of the performance of fuzzing to the smart terminal fuzzing apparatus 100 through the fuzzing client A 21. Each of the fuzzing node B-1 34 and the fuzzing node B-2 35 performs fuzzing and transfers the results of the performance of fuzzing to the smart terminal fuzzing apparatus 100 through the fuzzing client B 22.

The fuzzing clients and the fuzzing nodes shown in FIG. 1 may be operated and configured such that the number of fuzzing clients and the number of fuzzing nodes are increased.

Next, the smart terminal fuzzing apparatus 100 using a multi-node structure will be described in detail with reference to FIG. 2.

Figure 2:
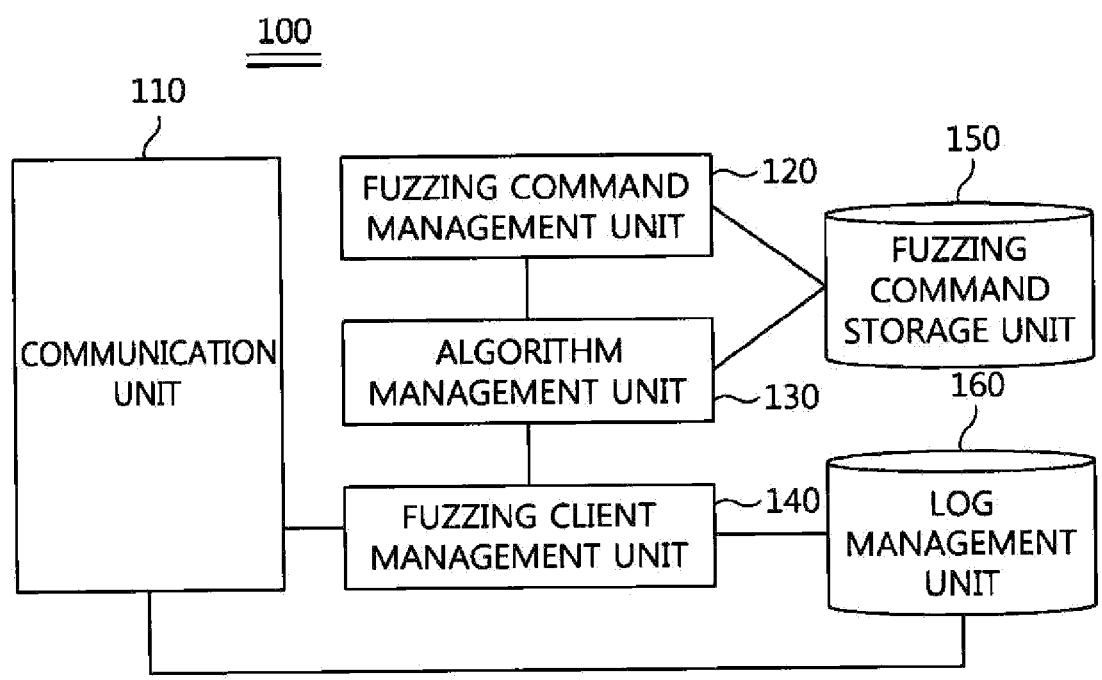
FIG. 2 is a diagram showing a smart terminal fuzzing apparatus using a multi-node structure according to an embodiment of the present invention.

FIG. 2 is a diagram showing the smart terminal fuzzing apparatus using a multi-node structure according to an embodiment of the present invention.

Referring to FIG. 2, the smart terminal fuzzing apparatus 100 includes a communication unit 110, a fuzzing command management unit 120, an algorithm management unit 130, a fuzzing client management unit 140, a fuzzing command storage unit 150, and a log, management unit 160.

The communication unit 110 transfers fuzzing commands to N fuzzing clients, respectively, or receives fuzzing results corresponding to the transferred fuzzing commands from the corresponding fuzzing clients.

The fuzzing command management unit 120 manages fuzzing instructions corresponding to the performance of fuzzing. Here, the fuzzing instructions include a target file which is to be fuzzed, a method of modulating the target file, a method of executing a modulated file, a path for storing the results of execution, etc.

The algorithm management unit 130 creates fuzzing commands in compliance with the fuzzing instructions, checks the number of fuzzing nodes connected to each fuzzing client and the current status of a queue, and distributes the fuzzy commands depending on a distribution algorithm. Here, the distribution algorithm is an algorithm for distributing fuzzing areas depending on fuzzing clients, wherein the sequence of distributed fuzzing areas may be set and fuzzing commands may be distributed according to the set sequence.

In this way, the algorithm management unit 130 according to the embodiment of the present invention distributes fizzing commands depending on the number and status of fuzzing nodes received from the fuzzing clients and depending on the current status of the queue, and thus uses a distribution algorithm enabling optimal time to be required.

Distribution algorithms may be classified into a method of distributing a single fuzzing command to a single node and a method of distributing multiple fuzzing commands to multiple nodes. The method of distributing fuzzing commands to multiple nodes may include a method of distributing fuzzing commands according to the current status of the queue and a method of equally distributing fuzzing commands.

The fuzzing client management unit 140 identifies a target fuzzing client based on the Internet Protocol (IP) address of each of N fuzzing clients and detects the status of a connection to each fuzzing client currently connected thereto. Further, the fuzzing client management unit 140 transfers the fuzzing commands distributed by the algorithm management unit 130 and files to be manipulated to respective fuzzing clients, and controls the fuzzing clients such that fuzzing is performed by the corresponding fuzzing nodes.

In detail, the fuzzing client management unit 140 receives the information of the connected fuzzing client, and creates, deletes, or revises fuzzing clients based on the received information.

Further, the fuzzing client management unit 140 checks fuzzing nodes connected to the fuzzing client A 21 and the fuzzing client B 22, and detects the status of queue and the operating status of individual fuzzing nodes (for example, the fuzzing node A-1 31, the fuzzing node A-2 32, the fuzzing node A-3 33, the fuzzing node B-1 34, and the fuzzing node B-2 35). In this case, the fuzzing client management unit 140 may interrupt the execution of a corresponding fuzzing command or may re-execute the corresponding fuzzing command if it is determined that the fuzzing command is not smoothly executed, based on the results of the detection of the operating status.

The fuzzing command storage unit 150 stores fuzzing instructions managed by the fuzzing command management unit 120 and fuzzing commands distributed by the algorithm management unit 130. Further, the fuzzing command storage unit 150 stores the operating status of the distributed fuzzing commands, the results of the execution of the fuzzing commands, etc.

The log management unit 160 receives and stores the results of fuzzing performed in compliance with the fuzzing commands. In this case, the log management unit 160 manages log stored such that which fuzzing commands stored in the fuzzing command storage unit 150 are connected to the results of fuzzing performed in compliance with the fuzzing commands.

Next, the configuration of a fuzzing client will be described in detail with reference to FIG. 3.

Figure 3:
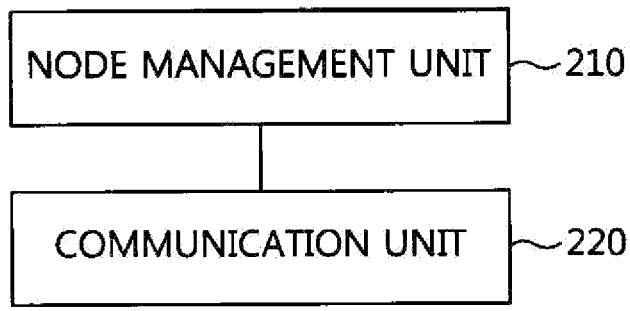
FIG. 3 is a diagram showing the configuration of a fuzzing client according to an embodiment of the present invention.

FIG. 3 is a diagram showing the configuration of a fuzzing client according to an embodiment of the present invention.

First, each of the fuzzing client A 21 and the fuzzing client B 22 of FIG. 1 corresponds to the fuzzing client of FIG. 3.

Referring to FIG. 3, a fuzzing client 200 includes a node management unit 210 and a communication unit 220.

The node management unit 210 performs communication with the corresponding fuzzing node of a plurality of fuzzing nodes through the communication unit 220. For example, the node management unit of the fuzzing client 21 performs communication with the fuzzing node A-1 31, the fuzzing node A-2 32, and the fuzzing node A-3 33.

Further, the node management unit 210 may be connected to the fuzzing nodes through a communication network or using USB communication. When connecting to fuzzing nodes through the communication network, connections are made based on IP addresses, whereas when connecting to the fuzzing nodes using USB communication, the status of connections is checked using protocols used by smart terminals based on the information of terminals connected to a USB device, and connections are made based on the protocols. Further, when emulators are used, connections to fuzzing nodes may be made using a virtual network drive or virtual USB information.

As described above, the fuzzing client 200 may perform communication with the smart terminals or the emulators via the corresponding fuzzing nodes. For this, a fuzzing node which is to perform fuzzing on the corresponding smart terminal may be installed, and this operation may be performed on the fuzzing client 200 under the control of the smart terminal fuzzing apparatus 100.

Next, the configuration of the fuzzing node will be described in detail with reference to FIG. 4.

Figure 4:
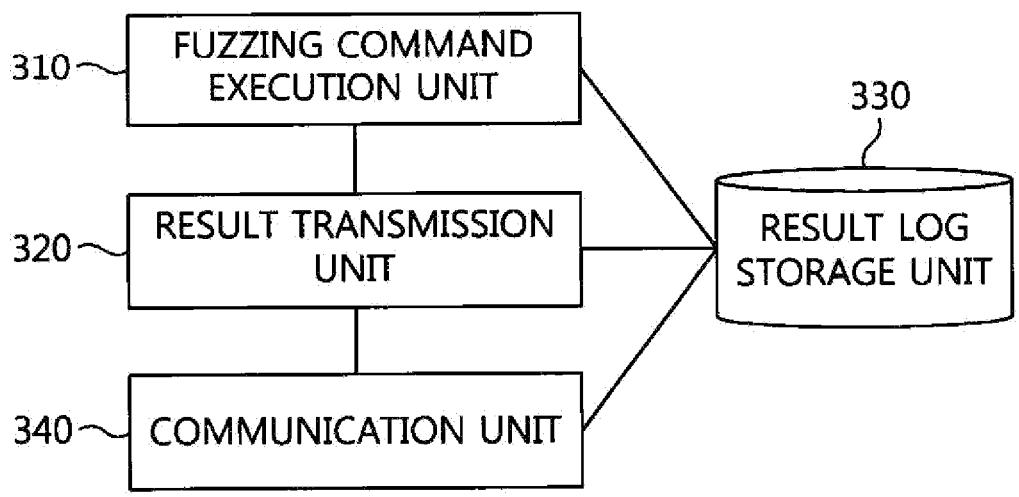
FIG. 4 is a diagram showing the configuration of a fuzzing node according to an embodiment of the present invention.

FIG. 4 is a diagram showing the configuration of a fuzzing node according to an embodiment of the present invention.

Referring to FIG. 4, a fuzzing node 300 includes a fuzzing command execution unit 310, a result transmission unit 320, a result log storage unit 330, and a communication unit 340.

The fuzzing command execution unit 310 generates a fuzzing sample by revising a file to be modulated in compliance with a fuzzing command, and performs fuzzing using the generated fuzzing sample depending on an execution method designated by the fuzzing command. Further, the fuzzing command execution unit 310 stores the results of performance of fuzzing, that is, fuzzing results, in the result log storage unit 330.

In order for the fuzzing command execution unit 310 to perform fuzzing, a fuzzing node may be operated in a native environment depending on the operating method of a program, or may perform fuzzing in a sandbox executed by an application. When fuzzing is required for the execution of a program in a virtual environment so, as to execute a program depending on the characteristics of a smart terminal, an application execution tool may be used.

Further, when it is determined that error is not present in software even if the fuzzing command execution unit 310 performs fuzzing, the software is normally executed even if the software is executed by using a fuzzing sample as input. If the software is normally operated for a predetermined period of time or longer, or if the execution of software using a fuzzing sample as input is completed, or if the operating status of a smart terminal enters an idle state, it can be determined that the software is normally operated. However, when errors or vulnerable points are present in software, a program is terminated or is abnormally operated. In this case, the fuzzing command execution unit 310 stores the unique number, type, OS information, and loaded shared libraries of a smart terminal corresponding to error, memory status such as the call stack, Link Register (LR), Stack Pointer (SP), and Instruction Pointer (IP) of the smart terminal, input files, fuzzing commands, etc. m the result log storage unit 330.

The result transmission unit 320 transmits the fuzzing results stored in the result log storage unit 330 to the smart terminal fuzzing apparatus 100 through the communication unit 340. Here, the transmission of the fuzzing results may be performed by collecting results obtained at each time when the results are generated, or results stored for a predetermined period of time, but it is not limited to such examples.

The communication unit 340 receives a fuzzing command from a fuzzing client 200 through a communication network or using USB communication, and transmits fuzzing results to the smart terminal fuzzing apparatus 100 through the communication network.

Below, a smart terminal fuzzing method using a multi-node structure will be described in detail with reference to FIG. 5.

Figure 5:
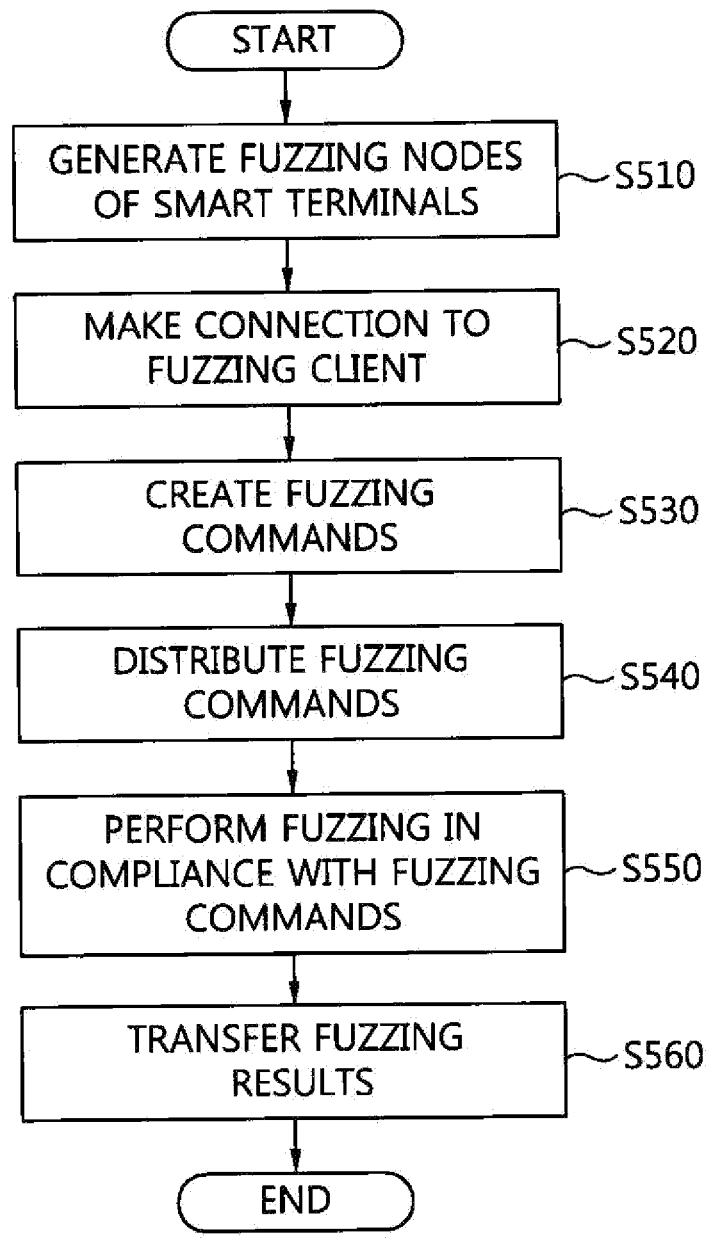
FIG. 5 is a flowchart showing a smart terminal fuzzing method using a multi-node structure according to an embodiment of the present invention.

FIG. 5 is a flowchart showing a smart terminal fuzzing method using a multi-node structure according to an embodiment of the present invention.

Referring to FIG. 5, the smart terminal fuzzing apparatus 100 generates fuzzing nodes which are to perform fuzzing on smart terminals at step S510. In this case, the smart terminal fuzzing apparatus 100 may be connected to the fuzzing nodes through a communication network or using USB communication. When connecting to the fuzzing nodes over the communication network, connections to the fuzzing nodes may be made based on IP addresses. Further, when connecting to the fuzzing nodes using USB communication, the status of connections is checked using protocols used by the smart terminals based on the information of terminals connected to a USB device, and connections are made based on the protocols.

The smart terminal fuzzing apparatus 100 makes a connection to the fuzzing client 200 corresponding to the fuzzing, nodes, generated at step S510, at step S520. Here, the fuzzing client 200 may perform communication with smart terminals or emulators via the fuzzing nodes. For this, fuzzing nodes which are to perform fuzzing on smart terminals may be installed, and this operation may be performed by the fuzzing client 200 under the control of the smart terminal fuzzing apparatus 100.

The smart terminal fuzzing apparatus 100 creates fuzzing commands based on fuzzing instructions at step S530. In this case, the fuzzing instructions include a target file which is to be fuzzed, a method of modulating the target file, a method of executing a modulated target file, a path for storing the results of execution, etc.

The smart terminal fuzzing apparatus 100 checks the number of fuzzing nodes connected to the fuzzing client and the current status of queue, and distributes the fuzzing commands depending on a distribution algorithm at step S540. Here, the distribution algorithm is an algorithm for distributing fuzzing areas depending on fuzzing clients, wherein the sequence of distributed fuzzing areas may be set and fuzzing commands may be distributed according to the set sequence.

The smart terminal fuzzing apparatus 100 according to the embodiment of the present invention distributes the fuzzing commands to the fuzzing nodes 300 depending on the number and status of fuzzing nodes received from the fuzzing client and depending on the current status of the queue, and thus uses a distribution algorithm enabling optimal time to be required.

The smart terminal fuzzing apparatus 100 performs control such that fuzzing is performed by the corresponding fuzzing nodes 300 in compliance with the fuzzing commands via the fuzzing client 200, connected at step S520, at step S550. Here, the fuzzing client 200 performs control such that a fuzzing sample is generated by revising a file to be modulated in compliance with a fuzzing command, and fuzzing is performed using, the generated fuzzing sample depending on an execution method designated by the fuzzing command.

The smart terminal fuzzing apparatus 100 receives the results of fuzzing performed at step S550 from the fuzzing nodes 300 though the fuzzing client at step S560.

At step S560, each fuzzing node 300 generates a fuzzing sample by revising a file to be manipulated in compliance with the corresponding fuzzing command, and performs fuzzing using the generated fuzzing sample depending on an, execution method designated by the fuzzing command.

As described above, the present invention may detect the vulnerable points of software at high speed by performing fuzzing using a plurality of smart terminals.

In accordance with the present invention, the smart terminal fuzzing apparatus and method using a multi-node structure are advantageous in that a conventional problem of requiring a period from several days to several months so as to execute a single fuzzing sample may be solved by performing parallel fuzzing on multiple nodes using a plurality of terminals, thus shortening the time required for fuzzing, and eliminating a fuzzing interruption phenomenon caused by errors upon performing fuzzing.

Further, in accordance with the present invention, the smart terminal fuzzing apparatus and method using a multi-node structure are advantageous in that fuzzing time is shortened, so that the errors or vulnerable points of software may be detected in a short period of time, thus prevent hacking from occurring using the vulnerable points of software and improving security.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A smart terminal fuzzing method using a multi-node structure, comprising:
    generating, by a smart terminal fuzzing apparatus, a plurality of fuzzing nodes that are to perform fuzzing on a plurality of smart terminals, respectively;
    making a connection to a fuzzing client corresponding to the plurality of fuzzing nodes;
    creating fuzzing commands to be transmitted to the plurality of smart terminals;
    distributing the fuzzing commands to the plurality of fuzzing nodes connected to the fuzzing client depending on a distribution algorithm; and
    performing control such that fuzzing is performed by the plurality of fuzzing nodes in compliance with the fuzzing commands through the fuzzing client,
    wherein distributing the fuzzing commands to the fuzzing nodes is configured to check a number of the fuzzing nodes connected to the fuzzing client and distribute the fuzzing commands to the fuzzing nodes depending on the distribution algorithm, and
    wherein the distribution algorithm is an algorithm for distributing fuzzing areas depending on the fuzzing client, and is configured to set a sequence of distributed fuzzing areas and distribute the fuzzing areas to the fuzzing nodes according to the set sequence.

2. The smart terminal fuzzing method of claim 1, wherein creating the fuzzing commands is configured to create the fuzzing commands based on fuzzing instructions to be transmitted to the plurality of smart terminals.

3. The smart terminal fuzzing method of claim 2, wherein the fuzzing instructions include a target file which is to be fuzzed, a method of modulating the target file, a method of executing a modulated target file, and a path for storing the results of execution.

4. A smart terminal fuzzing apparatus using a multi-node structure, comprising:
    a fuzzing command management unit for managing fuzzing instructions corresponding to performance of fuzzing;
    an algorithm management unit for creating fuzzing commands based on the fuzzing instructions, and distributing the fuzzing commands to a plurality of fuzzing nodes connected to a fuzzing client depending on a distribution algorithm;
    a fuzzing client management unit for performing control such that fuzzing is performed by the plurality of fuzzing nodes in compliance with the fuzzing commands through the fuzzing client; and a log management unit for receiving results of performance of fuzzing from the plurality of fuzzing nodes and managing the fuzzing results, wherein the algorithm management unit checks a number of the fuzzing nodes connected to the fuzzing client and distributes the fuzzing commands to the fuzzing nodes depending on the distribution algorithm, and wherein the distribution algorithm is an algorithm for distributing fuzzing areas depending on the fuzzing client, and is configured to set a sequence of distributed fuzzing areas and distribute the fizzing areas to the fuzzing nodes according to the set sequence.

5. The smart terminal fuzzing apparatus of claim 4, wherein the fuzzing instructions include a target file which is to be fuzzed, a method of modulating the target file, a method of executing a modulated target file, and a path for storing the results of execution.

6. The smart terminal fuzzing apparatus of claim 4, wherein the log management unit connects the fuzzing commands to results of performance of fuzzing by the plurality of fuzzing nodes in compliance with the fuzzing commands and manages connected results as a log.

\* \* \* \* \*